United States Patent
Linden (10) Patent No.: US 11,724,190 B2
(45) Date of Patent: Aug. 15, 2023

(54) SYSTEMS AND METHODS FOR MODIFYING GAME ASSETS OF AN ONLINE GAMING PLATFORM BASED ON TRADEABLE ITEMS

(71) Applicant: Mythical, Inc., Sherman Oaks, CA (US)

(72) Inventor: John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

(21) Appl. No.: 17/555,006

(22) Filed: Dec. 17, 2021

(65) Prior Publication Data

US 2022/0105434 A1 Apr. 7, 2022

Related U.S. Application Data

(63) Continuation of application No. 16/747,849, filed on Jan. 21, 2020, now Pat. No. 11,247,127.

(51) Int. Cl.
*A63F 13/60* (2014.01)
*G06Q 10/087* (2023.01)
(Continued)

(52) U.S. Cl.
CPC .............. *A63F 13/60* (2014.09); *A63F 13/30* (2014.09); *A63F 13/79* (2014.09); *G06F 16/9535* (2019.01); *G06Q 10/087* (2013.01); *A63F 2300/1025* (2013.01); *A63F 2300/5546* (2013.01); *A63F 2300/6009* (2013.01); *G06Q 40/04* (2013.01)

(58) Field of Classification Search
CPC .............. A63F 13/60; A63F 2300/5546; A63F 2300/6009
See application file for complete search history.

(56) References Cited

U.S. PATENT DOCUMENTS

| 7,314,407 B1 | 1/2008 | Pearson |
| 7,386,517 B1 | 6/2008 | Donner |

(Continued)

OTHER PUBLICATIONS

Roblox Blog, "The Gift of Roblox", Nov. 18, 2011, pp. 1-3, at https://blog.roblox.com/2011/11/the-gift-of-roblox (last visited Nov. 4, 2021) (Year: 2011).

*Primary Examiner* — James S. McClellan
(74) *Attorney, Agent, or Firm* — Esplin & Associates, PC (57) ABSTRACT

Systems and methods for modifying game assets based on tradeable items that are associated with user accounts of users of the online gaming platform are disclosed. Exemplary implementations may: store, in electronic storage, item information associated with the tradeable items; obtain a first item identifier of a first tradeable item; obtain first user information of a first user account; link the first tradeable item with the first user account such that a first item-account connection is established; store the first item-account connection; obtain, based on the first item identifier, the first modification information; receive, from the first user, an indication of a selection of a first game asset to be modified based on the first modification information such that a first asset-item connection is established; and modify, based on the first modification information, the first attribute information in accordance with the first tradeable item.

16 Claims, 5 Drawing Sheets

(51) Int. Cl.
*G06F 16/9535* (2019.01)
*A63F 13/79* (2014.01)
*A63F 13/30* (2014.01)
*G06Q 40/04* (2012.01)

(56) References Cited

U.S. PATENT DOCUMENTS

| | | |
|---|---|---|
| 8,523,648 B2 | 9/2013 | Gilson |
| 9,406,058 B1 | 8/2016 | Rebeil |
| 10,664,863 B1 | 5/2020 | Mishra |
| 10,946,291 B1 | 3/2021 | Harris |
| 11,173,401 B1 | 11/2021 | Linden |
| 11,247,127 B1 | 2/2022 | Linden |
| 2002/0028710 A1 | 3/2002 | Ishihara |
| 2004/0166913 A1 | 8/2004 | Shinoda |
| 2005/0059483 A1 | 3/2005 | Borge |
| 2006/0015436 A1 | 1/2006 | Burns |
| 2006/0068860 A1 | 3/2006 | Ueshima |
| 2006/0089897 A1 | 4/2006 | Maas |
| 2007/0202952 A1 | 8/2007 | Francis |
| 2007/0211047 A1 | 9/2007 | Doan |
| 2010/0029380 A1 | 2/2010 | Rhoads |
| 2010/0169231 A1 | 7/2010 | Bowles |
| 2010/0229106 A1 | 9/2010 | Lee |
| 2012/0109787 A1 | 5/2012 | Larrick |
| 2014/0333025 A1 | 11/2014 | Amireh |
| 2016/0287998 A1 | 10/2016 | Kawanabe |
| 2018/0043259 A1 | 2/2018 | Wong |
| 2019/0251295 A1* | 8/2019 | Vieyra .................... H04L 9/30 |

\* cited by examiner

SYSTEMS AND METHODS FOR MODIFYING GAME ASSETS OF AN ONLINE GAMING PLATFORM BASED ON TRADEABLE ITEMS

FIELD OF THE DISCLOSURE

The present disclosure relates to systems and methods for modifying game assets of an online gaming platform based on tradeable items that are associated with user accounts of users of the online gaming platform.

BACKGROUND

Distributed ledgers are known techniques to produce a secure record or registry of ownership of assets, transactions, and other information. For example, a distributed blockchain can be used to maintain a distributed ledger. Blockchain technology is known, e.g., as used for cryptocurrencies, smart contracts, and other applications for a decentralized database.

SUMMARY

One aspect of the present disclosure relates to modifying in-game assets based on real-world items obtained by users. The game assets may include one or more virtual items (e.g., characters, weapons, vehicles, etc.) that a user may use or put into play within a gaming platform. The user may purchase, trade, and/or discover one or more items and subsequently link a user account of the user with the items. Documentation of the linkage may be stored to, for example, a distributed ledger. The items may include, for example, toy figurines, playing cards, coins, and/or other real-world physical items. Furthermore, the items may be associated with modifications that may be effectuated upon a game asset. The user account may include an inventory of game assets belonging to the user within the gaming platform. The user may select a game asset from the inventory to acquire the modifications associated with the item. Lastly, the selected game asset may be modified based on the modifications associated with the item. The modifications may be a function of or take into consideration previous game assets the item has modified and statistics thereof, previous user accounts the item has linked with and statistic thereof, current location of the item, and/or other factors.

One aspect of the present disclosure relates to a system configured for modifying game assets of an online gaming platform based on tradeable items that are associated with user accounts of users of the online gaming platform. The system may include one or more hardware processors configured by machine-readable instructions. The computer components may include one or more of an obtain component, an account link component, an asset link component, a modify component, and/or other computer components.

Electronic storage may be configured to store item information associated with the tradeable items. The tradeable items may be real-world physical items. The individual tradeable items may be identified by an item identifier. The item information may include modification information that is useable to modify attribute information of the individual game assets. The tradeable items may include a first tradeable item identified by a first item identifier and associated with first item information stored in the electronic storage.

The obtain component may be configured to obtain the first item identifier of the first tradeable item. The first tradeable item may be associated with the first item information that includes first modification information. The obtain component may be configured to obtain first user information of a first user account. The first user account may be associated with a first user. The first user information may include first user identification information of the first user.

The link component may be configured to link the first tradeable item with the first user account within the online gaming platform such that a first item-account connection is established. The first user account may include a first inventory of game assets. The individual game assets may be defined by asset information, the asset information including attribute information, the attribute information defining type of game asset, abilities, aesthetics, and/or others of the individual game assets. The link component may be configured to store the first item-account connection.

The asset link component may be configured to receive, from the first user, an indication of a selection of a first game asset from the first inventory of game assets to be modified based on the first modification information. The first modification information may be included in the first item information that is associated with the first tradeable item such that the first game asset is to be modified in accordance with the first tradeable item. The asset link component may be configured to link the first game asset with the first tradeable item such that a first asset-item connection is established. The first game asset may include first asset information. The first asset information may include first attribute information.

The modify component may be configured to obtain, based on the first item identifier, the first modification information from the electronic storage. The modify component may be configured to modify, based on the first modification information, the first attribute information in accordance with the first tradeable item such that the first game asset is modified.

As used herein, any association (or relation, or reflection, or indication, or correspondency) involving servers, processors, client computing platforms, virtual items, user accounts, inventories, game assets, tradeable items, item identifiers, indications, linkage, recordings, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be

DETAILED DESCRIPTION

Figure 1:
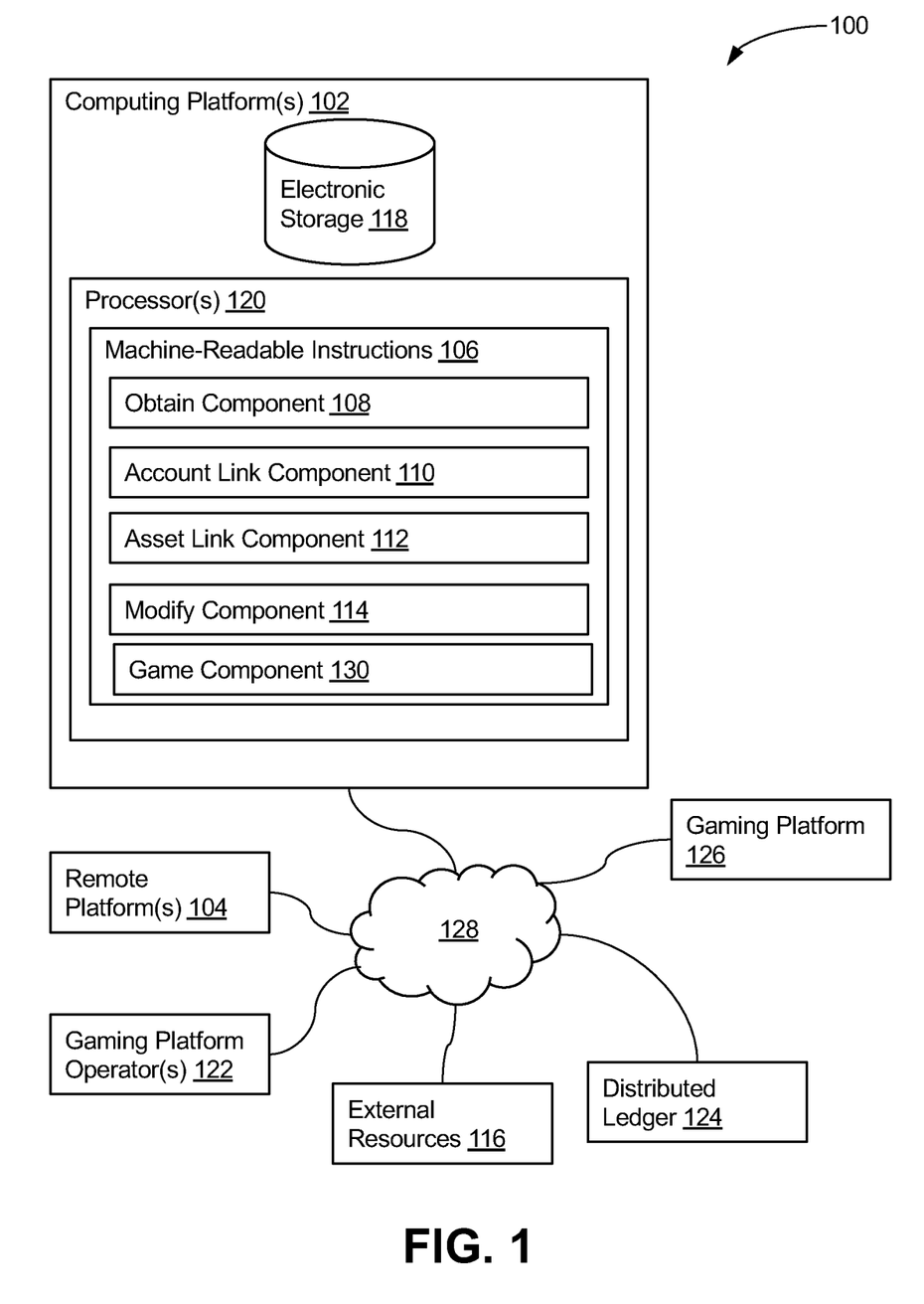
FIG. 1 illustrates a system configured for modifying game assets of an online gaming platform based on tradeable items that are associated with user accounts of users of the online gaming platform, in accordance with one or more implementations.

FIG. 1 illustrates a system 100 configured for modifying game assets of an online gaming platform based on tradeable items that are associated with user accounts of users of the online gaming platform, in accordance with one or more implementations. In some implementations, system 100 may include one or more of servers 102. Server(s) 102 may be configured to communicate with one or more client computing platforms 104 according to a client/server architecture and/or other architectures via one or more network(s) 128. In some implementations, one or more network(s) 128 may include the Internet and/or other networks. Client computing platform(s) 104 may be configured to communicate with other client computing platforms via server(s) 102 and/or according to a peer-to-peer architecture, a client-server architecture, and/or other architectures. Users may access system 100 via client computing platform(s) 104.

In some implementations, system 100 and/or server(s) 102 may be configured to communicate with one or more of (online) gaming platform(s) 126, gaming platform operator(s) 122, distributed ledger 124, and/or other components via one or more network(s) 128. As used herein, gaming platform 126 may refer to either an individual game, a type of gaming console and its ecosystem, and/or any combination of these. Gaming platform 126 may include one or more (online) games. Gaming platform operator 122 may refer to a host, operator, owner, and/or other stakeholder of gaming platform 126.

In some implementations, distributed ledger 124 (e.g., a blockchain or another structure of blocks) may be maintained by a distributed computing platform (not shown in FIG. 1). In some implementations, the distributed computing platform may be implemented by a set of client computing platforms and/or servers. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of distributed ledger(s) 124. The smart contracts may be stored on distributed ledger(s) 124. In some implementations, the distributed computing platform may be Ethereum. In some implementations, the distributed computing platform may be the EOSIO platform. In some implementations, the virtual machine may be a Turing-complete and decentralized virtual machine.

Distributed ledger(s) 124 may act as a decentralized database that stores a registry of assets and transactions across one or more networks 128. A given asset may be owned by a particular user. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights.

In some implementations, distributed ledger(s) 124 may record ownership of assets. Alternatively, and/or simultaneously, distributed ledger(s) 124 may record transactions that modify ownership of assets. A smart contract may be a type of asset. In some implementations, once a smart contract has been added to the distributed ledger, the smart contract may be referred to as published, recorded, and/or posted. Elements of distributed ledger(s) 124 may be grouped together in units that are referred to as blocks. For example, an individual block may include one or more assets and one or more transactions.

Distributed ledger(s) 124 may be publicly accessible and append-only. In some implementations, existing blocks of a distributed ledger can substantially not be altered or deleted, unless multiple copies of the distributed ledger are altered. This is unlikely to happen provided that multiple copies of the distributed ledger are stored on different computing platforms, e.g., in different geographical locations. The distributed ledger may be replicated (in part or in its entirety) on multiple computing platforms, preferably in multiple different geographical locations.

Server(s) 102 may be configured by machine-readable instructions 106. Machine-readable instructions 106 may include one or more instruction components. The instruction components may include computer program components. The instruction components may include one or more of an obtain component 108, an account link component 110, an asset link component 112, a modify component 114, game component 130, and/or other instruction components.

Gaming platform 126 may include one or more user accounts associated with one or more users. For example, the users may include a first user, a second user, a third user, and so forth. The one or more user accounts may include individual user information. The user information may include user identification information, location information, statistic information and/or other user information of the individual user accounts. The user identification information may include first name, last name, username, email address, phone number, and/or other user identification information for identifying individual users. The location information may be obtained from client computing platform(s) 104 of the one or more individual users. The location information may represent one or more real-world locations, e.g., of the one or more individual users in the real world, of one or more individual tradeable items in the real world, and/or of other entities in the real world. The real-world locations may be locations (e.g., addresses, GPS coordinates, landmarks, point on a virtual map, etc.) input by the individual users, location of an internet service provider (ISP) client computing platforms 104 associated with the individual users is using, location from a GPS of client computing platforms 104 associated with the individual users, location from a GPS of client computing platform 104 associated with the individual users when the tradeable items are in proximity to client computing platform 104, location of a GPS of client computing platform 104 associated with the individual users when client computing platform 104 identifies the tradeable items, and/or other real-world locations.

The statistic information may include values for a date of an individual user joining the online gaming platform, current level, experience points (XP), total number of tradeable items connected with, total number of tradeable items currently connected with, total number of game assets in an inventory, number of hours played within the online gaming platform, number of hours played with a particular game asset, and/or other statistic information.

Electronic storage 118 may be configured to store individual item information associated with one or more tradeable items. The individual tradeable items may be identified by one or more item identifiers. The individual tradeable items may be real-world physical items. By way of non-limiting example, the individual tradeable items may include a playing card, a toy figurine, and/or other real-world physical items. The one or more item identifiers may be item identifying information that identifies and distinguishes the tradeable items from each other. Physical manifestations of the one or more item identifiers may include a barcode, a QR code, radio frequency identifier (RFID), serial number, and/or other human-readable or machine-readable identifiers. A first tradeable item may be a real-world physical item identified by a first item identifier and associated with first item information stored in electronic storage 118.

The individual item information stored in electronic storage 118 may include individual modification information that is useable to modify attribute information of one or more individual game assets. The modification information may include, for example, a set of code that, upon execution, modifies individual game assets, asset information, attribute information, and/or other information related to individual game assets. The game assets may be (collections and/or packages of) virtual items usable within an online gaming platform, such as gaming platform 126. By way of non-limiting example, the game assets may include one or more of a weapon, character, tool, pet, clothing, vehicle, level, mission, assignment, chapter, task, mini-game, and/or other virtual items. Game assets may be usable within gaming platform 126 by an owner of a right to usage within gaming platform 136. The owner of a first particular game asset may be a first user, the owner of a second particular game asset may be a second user, and so forth. The individual game assets may be defined by asset information. In some implementations, asset information may include one or more of the attribute information, a set of rules, and/or other information. In some implementations, attribute information may define one or more of a type of game asset, abilities, aesthetics, and/or other attributes of the individual game assets. The attribute information of the individual game assets may be within at least one of the one or more (online) games. The set of rules may pertain to the individual game assets simultaneously being modified by more than one of the modification information of more than one of the individual tradeable items. The set of rules may include a maximum value of tradeable items that can modify the individual game asset simultaneously, one or more types of tradeable item the individual game asset can be modified by, and/or other rules. The individual user accounts may include individual inventories of one or more game assets. The one or more game assets of the individual inventories may be game assets that the user account, or the user, owns, won, leases, found, stole, and/or otherwise possesses.

The individual item information associated with the individual tradeable items may further include one or more of a historical location record, a historical user record, user prerequisites, asset prerequisites, a type of tradeable item, and/or other item information. The historical location record may include the location information of the users whose user accounts have previously linked with the individual tradeable items, as described herein. The historical user record may include user information of the user accounts that the individual tradeable items have been previously linked with. These records are further described in the Detailed Description. The user prerequisites may be requirements for the user accounts that need to be satisfied for the user accounts to be linked with the individual tradeable items. In some implementations, the user prerequisites may be requirements for the user accounts that need to be satisfied before (attribute information of) game assets may be modified as described herein. The user prerequisites may include one or more of specific values of the statistic information, ranges of values of the statistic information, and/or other user prerequisites. The game asset prerequisites may be requirements that need to be satisfied for a game asset to be modified by the one or more tradeable items. The game asset prerequisites may include values of the attribute information, ranges of values of the attribute information, and/or other game asset prerequisites. The type of tradeable item may specifically pertain to a particular online gaming platform, such as gaming platform 126. By way of non-limiting example, the types of tradeable items may include weapon modifiers, character modifiers, tool modifiers, vehicle modifiers, and/or other types depending on particular characteristics of gaming platform 126.

Obtain component 108 may be configured to obtain the one or more item identifiers of the one or more tradeable items. The one or more item identifiers may be obtained upon the one or more users capturing an image that includes the item identifier via one or more associated client computing platform(s) 104. The one or more tradeable items may be obtained by the one or more users by way of purchase, trading, discovery, and/or other obtainment. By way of non-limiting example, obtain component 108 may obtain the first item identifier of the first tradeable item. The first tradeable item may be associated with first item information that includes first modification information.

Obtain component 108 may be configured to obtain the one or more user information of the one or more user accounts. The user information may be obtained from client computing platform(s) 104 associated with the one or more users. The one or more users may be logged-in to gaming platform 126 via one or more associated client computing platform(s) 104 such that the one or more user information may be obtained by obtain component 108.

By way of non-limiting example, obtain component 108 may obtain first user information of a first user account. The first user account may be associated with a first user. The first user information may include one or more of first user identification information, first location information, first statistic information, and/or other user information of the first user account. By way of non-limiting example, obtain component 108 may obtain second user information of a second user account. The second user account may be associated with a second user. The second user information may include one or more of second user identification information, second location information, second statistic information, and/or other user information of the second user account.

Account link component 110 may be configured to link the one or more tradeable items with the one or more user accounts within the online gaming platform such that item-account connections are established between the individual tradeable items and the individual user accounts. The linkage may be responsive to obtaining the individual item identifiers and the individual user information (e.g., the user identification information). Account link component 110 may be configured to store the item-account connections. By way of non-limiting example, account link component 110 may link the first tradeable item with the first user account within the gaming platform 126 such that a first item-account connection is established. The first user account may include a first inventory of game assets that includes a first game asset. The first item information may include a first historical location record that includes the location information of the users whose user accounts have previously linked with the first tradeable item (i.e., previous item-account connections of the first tradeable item). Upon the established of the first item-account connection, the first historical location record may include the first location information. In some implementations, individual user accounts may be linked with multiple tradeable items. In some implementations, individual tradeable items may be linked with multiple user accounts.

Account link component 110 may be configured to store the item-account connections. Storing the item-account connections may include recording to a distributed ledger, database(s) stored in electronic storage 118, and/or other storing mechanism, components, and/or structures. By way of non-limiting example, in some implementations, account link component 110 may be configured to store the first item-account connection to distributed ledger 124.

Asset link component 112 may be configured to receive one or more indications of selections of individual game assets to be modified based on the individual modification information. The individual game assets selected may be from the individual inventories of game assets of the individual user accounts. The indications may be received from client computing platforms 104 associated with the individual users. As previously mentioned, the individual modification information may be included in the individual item information that is associated with the individual tradeable items such that the selected game assets are to be modified in accordance with the individual tradeable items. By way of non-limiting example, asset link component 112 may receive, from the first user, an indication of a selection of the first game asset from the first inventory of game assets to be modified based on the first modification information. The first modification information may be included in the first item information that is associated with the first tradeable item such that the first game asset is to be modified in accordance with the first tradeable item.

Asset link component 112 may be configured to link the selected game asset to be modified, based on the individual modification information, with the associated individual tradeable item such that asset-item connections are established. By way of non-limiting example, asset link component 112 may link the first game asset with the first tradeable item such that a first asset-item connection is established. In some implementations, individual game assets may be linked with multiple tradeable items. In some implementations, individual tradeable items may be linked with multiple game assets.

In some implementations, asset link component 112 may be configured to record the asset-item connections indicating individual game assets as being modified in accordance with individual tradeable items. The asset-item connections may be recorded to the distributed ledger, database(s) stored in electronic storage 118, and/or one or more other distributed ledgers. By way of non-limiting example, asset link component 112 may record, to distributed ledger 124, the first asset-item connection indicating the first game asset as being modified in accordance with the first tradeable item. The first game asset may include first asset information. The first asset information may include first attribute information.

Modify component 114 may be configured to obtain modification information from electronic storage 118. The obtainment may be based on the individual item identifiers that identify the individual tradeable items and thus the individual modification information. Modify component 114 may be configured to obtain item information from electronic storage 118 based on the corresponding individual item identifiers. By way of non-limiting example, modify component 114 may obtain, based on the first item identifier, the first modification information from electronic storage 118.

Modify component 114 may be configured to modify the individual attribute information of the individual game assets in accordance with the individual tradable items such that the individual game assets are modified. The modifications to be made to the game assets may be based on the individual modification information. The modifications of the individual attribute information may occur upon the establishment and storage of the individual asset-item connections. Modifying the attribute information may include diminishing the attribute information, enhancing the attribute information, no change in the attribute information, and/or other modifications. In some implementations, modifying the individual attribute information of the individual game assets may include storing the individual modifications to the user account of particular users, storing the individual modifications to the inventory of game assets of particular user accounts, storing the individual modifications to the user information of particular users, storing the individual modifications to distributed ledger 124, and/or others. By way of non-limiting example, modify component 114 may modify, based on the first modification information, the first attribute information in accordance with the first tradeable item such that the first game asset is modified.

In some implementations, modifying, based on the modification information, the individual attribute information in accordance with individual tradeable items may be based on the set of rules, past asset-item connections of the individual game assets (e.g., recorded to the distributed ledger), the values of the types of the individual tradeable items of the past asset-item connections involving the individual game assets (e.g., recorded to the distributed ledger), the type of the individual tradeable items, and/or other values. The asset-item connections of the individual game assets may indicate which particular tradeable item(s) the individual game assets are most currently being modified in accordance with. Based on these values, the modifying, based on the modification information, the attribute information may be rejected.

By way of non-limiting example, the types of the tradeable items may include fire type, water type, air type, land type, and/or other types. The first asset information may include a first set of rules limiting the first game asset to be modified in accordance with a water and air type of tradeable item simultaneously or with a land and fire type of tradeable item simultaneously only. Any other combination of types of tradeable items may reject individual tradeable items from modifying the first game asset. Distributed ledger 124 may have recorded a second asset-item connection indicating the first game asset as currently being modified in accordance with a second tradeable item, a fire type of tradeable item. The second tradeable item may include second item information that includes second modification information of which the first game asset is being modified based on. The first tradeable item may be a water type of tradeable item. Thus, based on the first set of rules, the asset-item connections involving the first game asset recorded to the distributed ledger (i.e., the second asset-item connection), the type of tradeable item the first game asset is currently being modified in accordance with (i.e., the second tradeable item that is fire type), and a value of the type of the first tradeable item (i.e., water type), modifying, based on the first modification information, the first attribute information may be rejected. In some implementations, rather than rejecting the modifying that is based on the first modification, the modifying that is based on the second modification information may be ceased and subsequently the first attribute information may be modified based on the first modification information (i.e., cease and/or replace modification information and/or effects thereof).

The (effects of executing the) modification information may be adjusted and/or otherwise varied based on one or more particular values such that the resulting modifications are a function of one or more of the historical location record, the user prerequisites, the game asset prerequisites, the historical user record, subsequent item-account connections, subsequent asset-item connections, individual attribute information of the one or more game assets that the individual tradeable item has previously modified, and/or other factors. In some implementations, the modification information itself may be adjusted upon obtainment from electronic storage. Alternatively, and/or simultaneously, in some implementations, or one or more particular modifications effectuated by the modification information may be adjusted. In some implementations, the individual modification information may be adjusted based on the individual historical location records of the individual tradeable items. For example, as mentioned above, the first historical location record may include the first location information that indicates the location of the first user. The first location information may indicate the first user is in Tokyo, Japan. The first modification information may be adjusted based on the first historical location record such that the first game asset (e.g., a weapon) is modified into a katana sword, for example, based on the location of the first user in addition to other modifications based on the first modification.

In some implementations, the individual modification information may be adjusted based on the individual user prerequisites of the individual tradeable items being met and further based on the values of the statistic information of the individual user information. By way of non-limiting example, the first item information may include a first set of user prerequisites that must be satisfied for the first tradeable item to be linked with the first user account. The first modification information may be adjusted based on the first set of user prerequisites being met and further based on values of the first statistic information. In other words, the first set of user prerequisites may require the first user be on level 10 (i.e., from the first statistic information), for example, for the first modification information to modify the first game asset to the fullest degree. Thus, upon the first user being on level 9 or below, the first modification information may be adjusted (e.g., lessened).

Figure 3A:
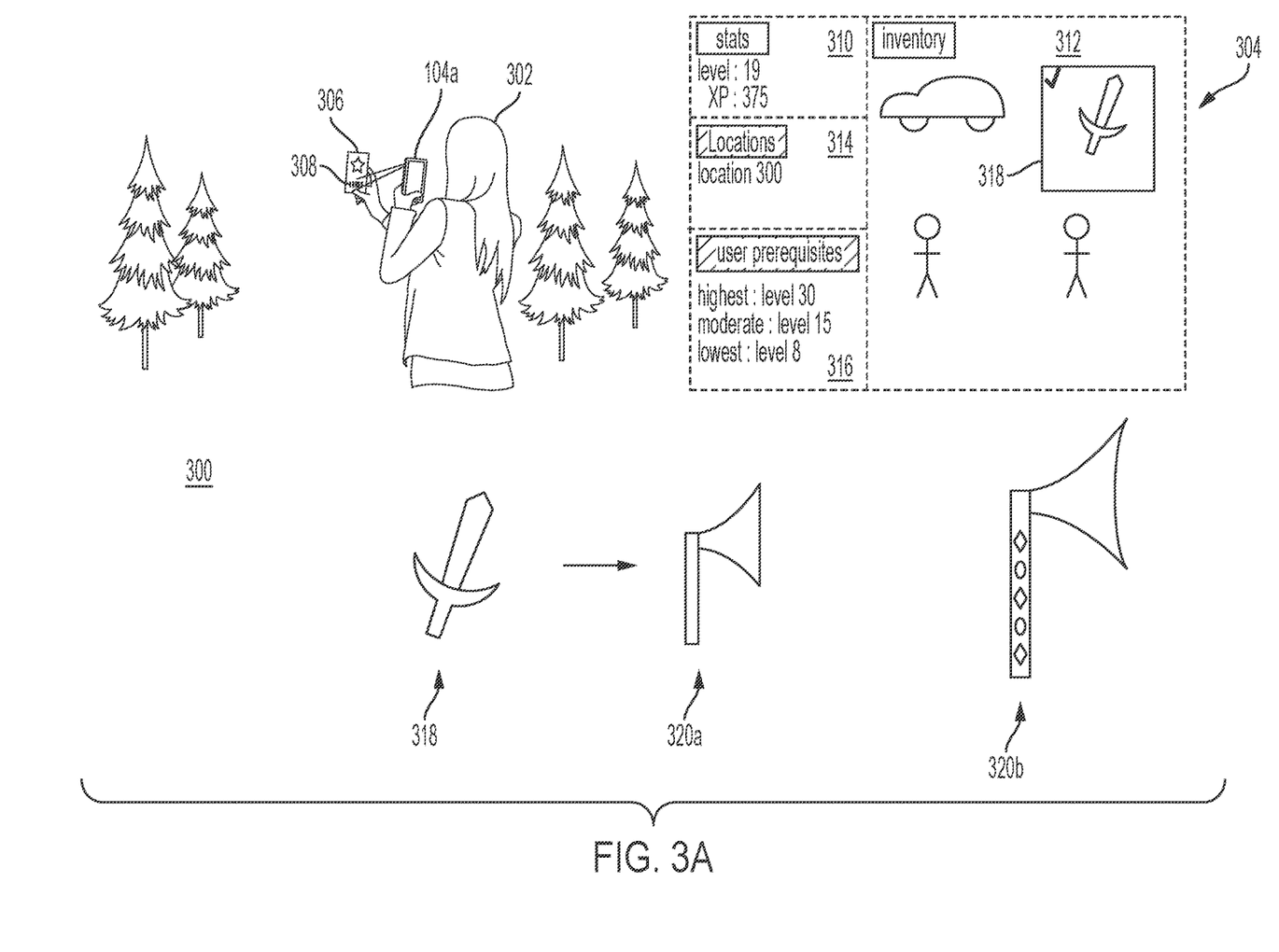
FIG. 3A illustrates an example implementation of the system configured for modifying game assets of an online gaming platform based on tradeable items that are associated with user accounts of users of the online gaming platform, in accordance with one or more implementations.

FIG. 3A illustrates an example implementation of the system configured for modifying game assets of an online gaming platform based on tradeable items that are associated with user accounts of users of the online gaming platform, in accordance with one or more implementations. FIG. 3A may illustrate user 302 playing gaming platform 304 in location 300. Location 300 may be a woodland location. User 302 may possess playing card 306 by way of purchase, trading, discovery, and/or other obtainment. Playing card 306 (i.e., tradeable item) may include barcode 308 (i.e., item identifier) printed on one side. At location 300, user 302 may image barcode 308 with smartphone 104*a*. System 100 may obtain item information associated with playing card 306 from storage (similar to electronic storage 118 of FIG. 1) based on barcode 308. System 100 may obtain user information of user 302 based on a user account of user 302 within gaming platform 304. User 302 may be logged-in to gaming platform 304 such that the user information of user 302 may be obtained by system 100. Upon obtaining the user information and the item information, an item-account connection may be established (and stored, e.g., to a distributed ledger) between the user account of user 302 and playing card 306 within gaming platform 304. The user information of user 302 may include location 300 based on a GPS of smartphone 104*a*, statistic information 310, and inventory 312. The item information may include modification information (not pictured) to enhance a game asset from inventory 312, historical location record, 314 and user prerequisites 316. User 302 may select weapon 318 (i.e., game asset) from inventory 312 to be modified by the modification information associated with playing card 306. Weapon 318 may include attribute information that is to be modified by use of the modification information associated with playing card 306. User prerequisites 316 may require user 302 to be on particular levels to benefit from particular degrees of enhancements of the modification information. Upon establishing and storing an asset-item connection between playing card 306 and weapon 318, weapon 318 (i.e., the attribute information thereof) may be modified based on the modification information. Modifications to the attribute information of weapon 318 may be evident in the size and/or aesthetic of weapon 318. The modification information may be adjusted based on historical location record 314 (i.e., woodland location 300), user prerequisites 316, and statistic information 310 (i.e., level 19) such that weapon 318 is modified into medium machete 320*a*. Had statistic information indicated user 302 be on level 30, weapon 318 may have been modified into large machete 320*b*.

Referring to FIG. 1, in some implementations, the individual modification information may be adjusted based on the individual game asset prerequisites of the individual tradeable items and the values of the attribute information of the individual game assets. The individual item information of the individual tradeable items may include game asset prerequisites that must be satisfied for a particular effect of the modification information associated with the individual tradeable item. The particular effects of the modification information that are based on the satisfaction of the game asset prerequisites may include one or more of maximum enhancements, moderate enhancements, minor enhancement, no enhancement, maximum diminishments, moderate diminishments, minor diminishments, no diminishments, a particular color, a particular accessory, a particular length, a particular weight, and/or other effects. By way of non-limiting example, the first item information may include first game asset prerequisites that must be satisfied for black wheel rims (i.e., the particular effect) of the first modification information (i.e., wheel rim modification). The first game asset may be a vehicle. The first attribute information may define a color of the first game asset. The first game asset prerequisites may require that the individual game assets (i.e., the first game asset) be blue or red for the first modification information to modify the individual game assets with the particular effect (i.e., effectuate black wheel rims), otherwise the individual game assets may be modified differently (e.g., silver wheel rims). Upon the first attribute information defining the first game asset as blue, the first game asset prerequisites may be satisfied. Thus, the first modification information may be adjusted based on the first game asset prerequisites (i.e., requirement of blue or red) and values of the first attribute information (i.e., blue) such that first game asset is modified with black wheel rims. Conversely, had the first game asset been defined as green, the first game asset may have been modified by the first modification information with silver wheel rims.

By way of non-limiting example, obtain component 108 may be configured to obtain the second user information of the second user account. The second user account may be associated with the second user. The second user information may include second identification information, second location information, second statistic information, and/or other user information of the second user. The second user account may include a second inventory of game assets that includes a second game asset. The second game asset may include second asset information that includes attribute information. Subsequently, account link component 110 may be configured to link the first tradeable item with the second user account within gaming platform 126 such that a second item-account connection is established. Account link component 110 may be configured to store the second item-account connection.

Modify component 114 may be configured to modify the individual attribute information based on subsequent establishments of item-account connections between the individual tradeable items and one or more other user accounts. By way of non-limiting example, modify component 114 may modify the first attribute information upon establishment of the second item-account connection such that the first attribute information that was modified by the first modification information may be further modified because the first tradeable item is most currently linked to the second user account. The further modification of the first attribute information that was modified by the first modification information may include ceasing the effects of the first modification information, weakening the effects of the first modification information, enhancing the effects of the first modification information, and/or other changes.

In some implementations, modify component 114 may be configured to modify the individual attribute information based on subsequent asset-item connections between the individual tradeable items and one or more other game assets. By way of non-limiting example, modify component 114 may modify the first attribute information upon a third asset-item connection being established and recorded to the distributed ledger. The third asset-item connection may represent the second game asset being selected by the second user to be modified based on the first modification information. The first attribute information (already modified based on the first modification information), may further be modified because the first modification information is most currently modifying the second game asset. The further modifications of the first attribute information may include ceasing the effects of the first modification information, weakening the effects of the first modification information, enhancing the effects of the first modification information, and/or other changes.

Figure 3B:
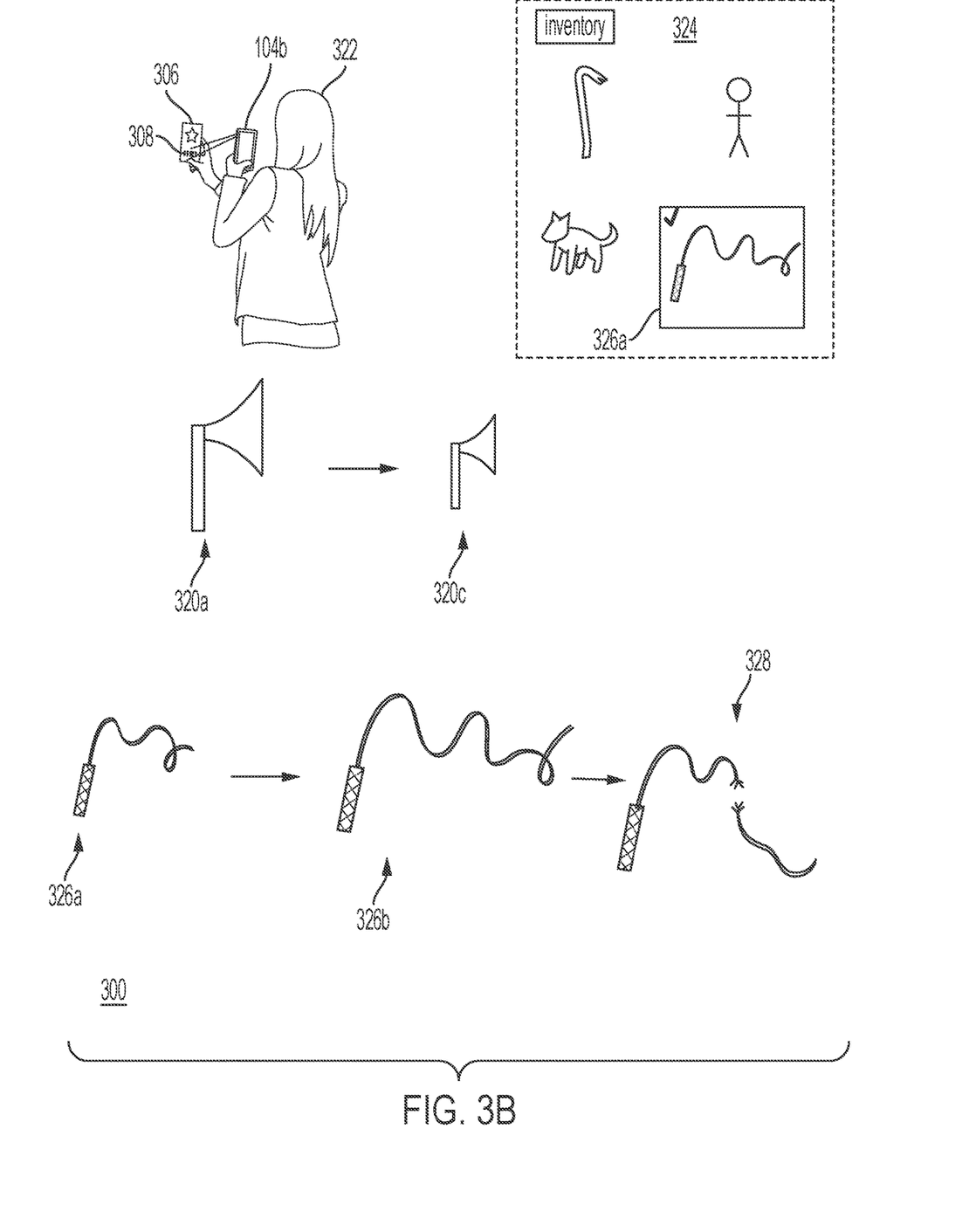
FIG. 3B illustrates an example implementation of the system configured for modifying game assets of an online gaming platform based on tradeable items that are associated with user accounts of users of the online gaming platform, in accordance with one or more implementations.

FIG. 3B illustrates an example implementation of the system configured for modifying game assets of an online gaming platform based on tradeable items that are associated with user accounts of users of the online gaming platform, in accordance with one or more implementations. FIG. 3B may illustrate user 322 playing gaming platform 304 in location 300. User 322 may possess playing card 306 by way of purchase, trading, discovery, and/or other obtainment. At location 300, user 322 may capture an image that includes barcode 308 with smartphone 104b. System 100 may obtain item information associated with playing card 306 from storage (similar to electronic storage 118 of FIG. 1) based on barcode 308. System 100 may obtain user information of user 322 based on a user account of user 322 within gaming platform 304. User 322 may be logged-in to gaming platform 304 such that the user information of user 322 may be obtained by system 100. Upon obtaining the user information and the item information, an item-account connection may be established (and stored, e.g., to a distributed ledger) between the user account of user 322 and playing card 306 within gaming platform 304. The user information of user 322 may include inventory 324. The item information may include modification information (not pictured) to enhance a game asset from inventory 324. User 322 may select weapon 326a (i.e., game asset) from inventory 324 to be modified by use of the modification information associated with playing card 306. Weapon 326a may include attribute information that is to be modified by the modification information associated with playing card 306. Upon the establishment of the item-account connection between the user account of user 322 and playing card 306 and/or an asset-item connection between playing card 306 and weapon 326a, weapon 320a (i.e., the attribute information thereof) may be further modified by the modification information such that weapon 320a may be diminished to smaller weapon 320c. Additionally, weapon 326a (i.e., the attribute information thereof) may be modified based on the modification information into larger weapon 326b. Modifications to the attribute information of weapon 320a and/or weapon 326a may be evident in the size and/or aesthetic of the respective weapons. Upon user 322 using weapon 326b in a battle, weapon 326b may become damaged weapon 328 such that the attribute information (i.e., aesthetic, usability, etc.) thereof is diminished.

Referring to FIG. 1, in some implementations, the individual modification information may be adjusted based on the values of the statistic information of the user information that are a part of the individual historical user records of the individual tradeable items. By way of non-limiting example, the first item information may include a first historical user record. The first historical user record may include the user information of the user accounts that the first tradeable item has been previously linked with. The first historical user record may include a third user information that is associated with a third user account. The third user account may be associated with a third user. The third user information of the third user account may include third statistic information. Subsequently, the first modification information may be adjusted based on values of the statistic information of the user information (e.g., the third statistic information) that are a part of the first historical user record such that the first modification information may be used to modify (e.g., only slightly enhance) the first game asset because the third user had 250 XP, for example.

In some implementations, the modification information may be adjusted based on values of the individual attribute information of the one or more game assets that the individual tradeable item has previously modified. In some implementations, the one or more game assets the individual tradeable item has previously modified may be based on the asset-item connections of the individual tradeable item recorded to the distributed ledger. By way of non-limiting example, distributed ledger 124 may, previous to the first asset-item connection, include a fourth asset-item connection indicating a third game asset as being modified in accordance with the first tradeable item. The third game asset may include third asset information that includes third attribute information. The first modification information may be adjusted based on the values of third attribute information such that the first game asset is diminished rather than enhanced because the third attribute information (e.g., of a car engine) indicated significant damage (e.g., from a past race).

Figure 3C:
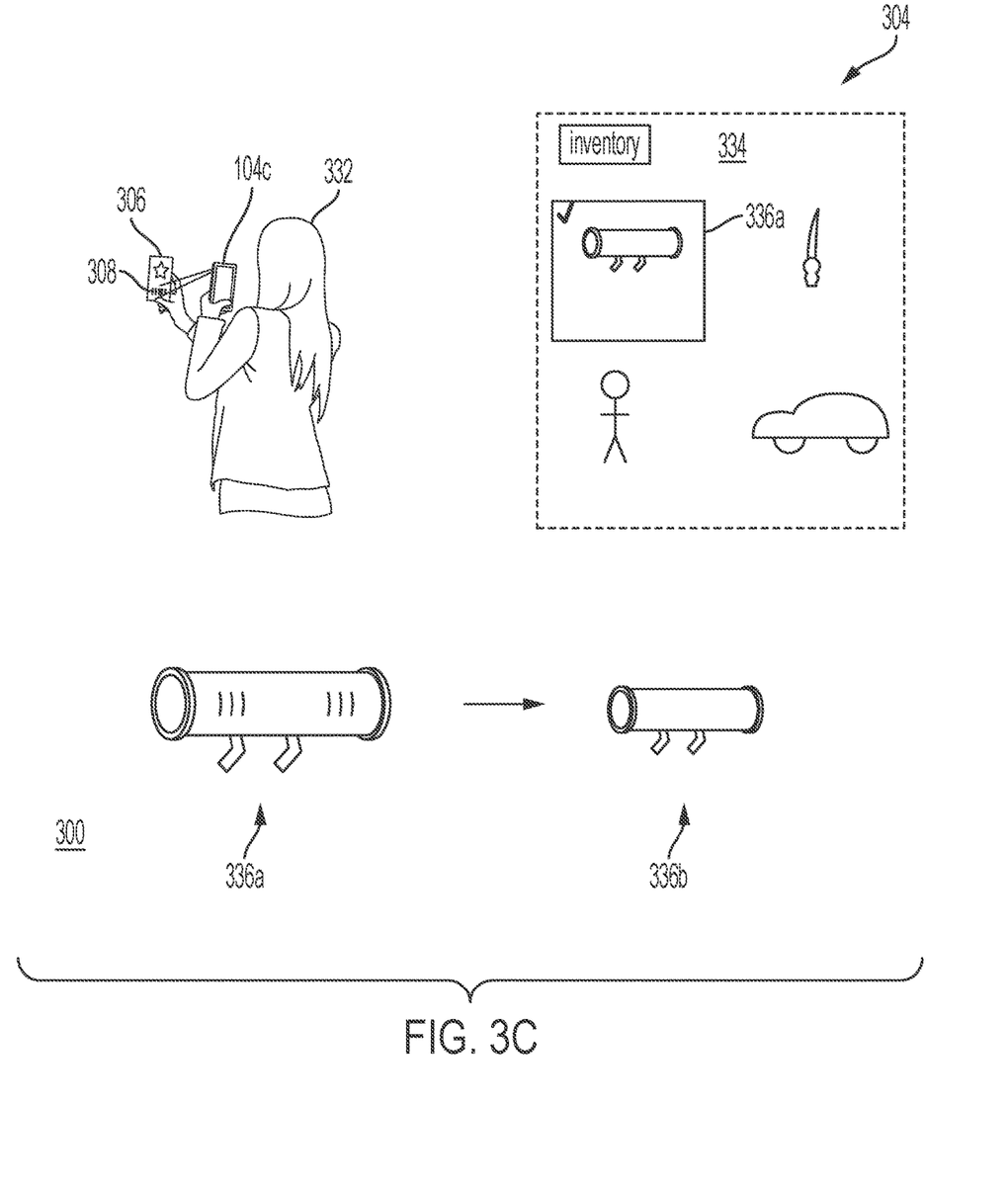
FIG. 3C illustrates an example implementation of the system configured for modifying game assets of an online gaming platform based on tradeable items that are associated with user accounts of users of the online gaming platform, in accordance with one or more implementations.

FIG. 3C illustrates an example implementation of the system configured for modifying game assets of an online gaming platform based on tradeable items that are associated with user accounts of users of the online gaming platform, in accordance with one or more implementations. FIG. 3B may illustrate user 332 playing gaming platform 304 in location 300. User 332 may possess playing card 306 by way of purchase, trading, discovery, and/or other obtainment. At location 300, user 332 may image barcode 308 with smartphone 104c. System 100 may obtain item information associated with playing card 306 from storage (similar to electronic storage 118 of FIG. 1) based on barcode 308. System 100 may obtain user information of user 332 based on a user account of user 332 within gaming platform 304. User 332 may be logged-in to gaming platform 304 such that the user information of user 332 may be obtained by system 100. Upon obtaining the user information and the item information, an item-account connection may be established (and stored, e.g., to a distributed ledger) between the user account of user 332 and playing card 306 within gaming platform 304. The user information of user 332 may include inventory 334. The item information may include modification information (not pictured) to enhance a game asset from inventory 334. User 332 may select weapon 336a (i.e., game asset) from inventory 334 to be modified by use of the modification information associated with playing card 306. Weapon 336a may include attribute information that is to be modified by the modification information associated with playing card 306. Upon the establishment of the item-account connection between the user account of user 332 and playing card 306 and/or an asset-item connection between playing card 306 and weapon 336a, weapon 336a (i.e., the attribute information thereof) may be modified based on the modification information into smaller weapon 336b. Modifications to the attribute information of weapon 336a may be based on the attribute information (i.e., aesthetic, usability, etc.) of game assets previously modified by the modification information associated with playing card 306. Thus, the modifications to the attribute information of weapon 336a may be based on the attribute information (i.e., aesthetic, usability, etc.) of weapon 328. The modifications may be evident in the size and/or aesthetic of weapon 336b.

Referring to FIG. 1, game component 130 may be configured to execute an instance of an online game within gaming platform 126. Game component 130 may be configured to implement the instance of the online game by receiving and executing commands based on user input (e.g., from users, through client computing platforms 104). At least part of the online game may take place in a virtual space that includes a simulated topography. The user input may be received from users through client computing platforms 104 associated with the users. Execution of the commands may facilitate interactions between the users. The execution of the commands may further facilitate locomotion of the one or more game assets controlled by the one or more users within the simulated topography of the virtual space. Implementing the instance of the online game may include determining view information for presentation of the online game to the players on client computing platforms 104.

In some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information outside of system 100, external entities participating with system 100, and/or other resources. In some implementations, some or all of the functionality attributed herein to external resources 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably communicable with server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, 112, and/or 114, and/or other components. Processor(s) 120 may be configured to execute components 108, 110, 112, and/or 114, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 120 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 120 may be configured to execute one or more additional components that may perform some or all of the functionality attributed below to one of components 108, 110, 112, and/or 114.

Figure 2:
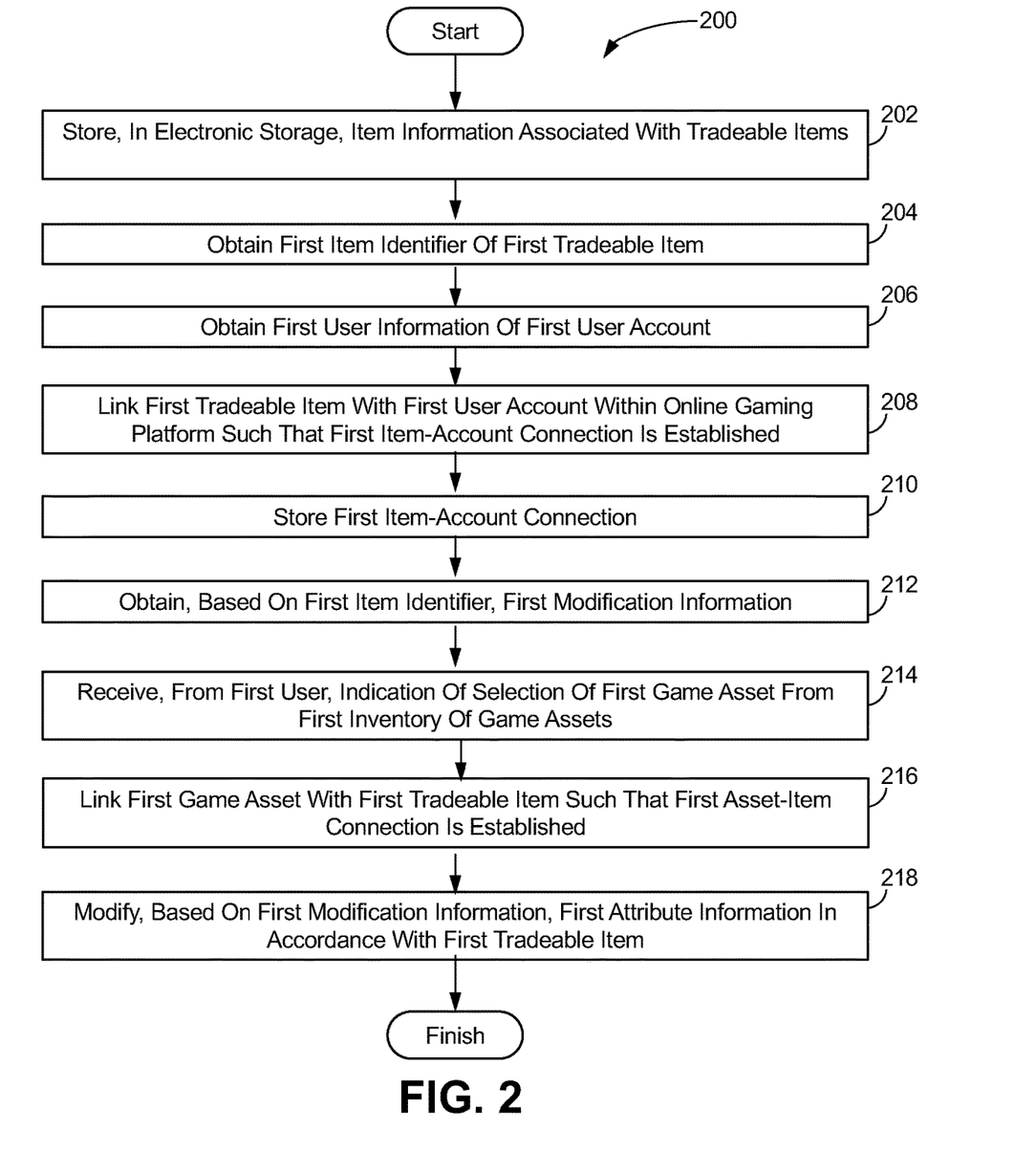
FIG. 2 illustrates a method for modifying game assets of an online gaming platform based on tradeable items that are associated with user accounts of users of the online gaming platform, in accordance with one or more implementations.

FIG. 2 illustrates a method 200 for modifying game assets of an online gaming platform based on tradeable items that are associated with user accounts of users of the online gaming platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing, in electronic storage, item information associated with the tradeable items. The individual tradeable items may be identified by an item identifier. The tradeable items may include a first tradeable item. The item information may include modification information that is useable to modify attribute information of the individual game assets. Operation 202 may be performed by one or more hardware processors configured by machine-readable instructions including a component that is the same as or similar to electronic storage 118, in accordance with one or more implementations.

An operation 204 may include obtaining a first item identifier of the first tradeable item. The first tradeable item may be associated with first item information that includes first modification information. Operation 204 may be performed by one or more hardware processors configured by machine-readable instructions including a component that is the same as or similar to obtain component 108, in accordance with one or more implementations.

An operation 206 may include obtaining first user information of a first user account. The first user account may be associated with a first user. Operation 206 may be performed by one or more hardware processors configured by machine-readable instructions including a component that is the same as or similar to obtain component 108, in accordance with one or more implementations.

An operation 208 may include linking the first tradeable item with the first user account within the online gaming platform such that a first item-account connection is established. Operation 208 may be performed by one or more hardware processors configured by machine-readable instructions including a component that is the same as or similar to account link component 110, in accordance with one or more implementations.

An operation 210 may include storing the first item-account connection. Operation 210 may be performed by one or more hardware processors configured by machine-readable instructions including a component that is the same as or similar to account link component 110, in accordance with one or more implementations.

An operation 212 may include obtaining, based on the first item identifier, the first modification information from the electronic storage. Operation 212 may be performed by one or more hardware processors configured by machine-readable instructions including a component that is the same as or similar to modify component 114 and electronic storage 118, in accordance with one or more implementations.

An operation 214 may include receiving, from the first user, an indication of a selection of a first game asset from the first inventory of game assets to be modified based on the first modification information. Operation 214 may be performed by one or more hardware processors configured by machine-readable instructions including a component that is the same as or similar to asset link component 112, in accordance with one or more implementations.

An operation 216 may include linking the first game asset with the first tradeable item such that a first asset-item connection is established. Operation 216 may be performed by one or more hardware processors configured by machine-readable instructions including a component that is the same as or similar to asset link component 112, in accordance with one or more implementations.

An operation 218 may include modifying, based on the first modification information, the first attribute information in accordance with the first tradeable item. Operation 218 may be performed by one or more hardware processors configured by machine-readable instructions including a component that is the same as or similar to attribute information modify component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for modifying game assets of an online gaming platform based on tradeable items that are associated with user accounts of users of the online gaming platform, wherein individual ones of the tradeable items are real-world physical items that include a first tradeable item, wherein the individual ones of the tradeable items are identified by an item identifier, wherein individual ones of the game assets are defined by asset information, the asset information including attribute information, the attribute information defining one or more of type of the individual ones of the game assets, abilities of the individual ones of the game assets, and aesthetics of the individual ones of the game assets, and wherein the online gaming platform is configured to execute an instance of an online game, the system comprising:

electronic storage configured to store item information associated with the tradeable items, wherein the item information includes modification information that is usable to modify attribute information of individual game assets, wherein the individual game assets include one or more virtual items within the online gaming platform, and wherein the item information includes first item information that includes first modification information; and one or more processors configured by machine-readable instructions to:

obtain a first item identifier of the first tradeable item, wherein the first tradeable item is associated with the first item information;

obtain first user information of a first user account within the online gaming platform, wherein the first user account is associated with a first user, wherein the first user information includes first location information representing a real-world location;

link the first tradeable item with the first user account within the online gaming platform such that a first item-account connection is established, wherein the first user account includes a first inventory of game assets;

record the first item-account connection on a distributed ledger, wherein the distributed ledger implements a blockchain;

receive, from the first user, an indication of a selection of a first game asset from the first inventory of game assets that is to be modified based on the first modification information, such that the first game asset is to be modified in accordance with the first tradeable item;

subsequent to the selection, link the first game asset with the first tradeable item such that a first asset-item connection is established;

record the first asset-item connection on the distributed ledger;

perform a modification of the first game asset within the online gaming platform, based on the first modification information of the linked first tradeable item as established through the first asset-item connection, such that the first attribute information of the first game asset is modified in accordance with the first tradeable item; and adjust the modification of the first game asset based on location information for previously-linked user accounts that were previously linked with the first tradeable item, wherein the location information for previously-linked user accounts is based on previously-stored item-account connections that have been recorded on the distributed ledger.

2. The system of claim 1, wherein the first item information includes a first historical location record including location information of the users whose user accounts have previously linked with the first tradeable item, wherein the first historical location record includes the first location information.

3. The system of claim 1, wherein modifying the first attribute information includes diminishing the first attribute information.

4. The system of claim 1, wherein modifying the first attribute information includes enhancing the first attribute information.

5. The system of claim 1, wherein user information of the individual user accounts includes statistic information, the statistic information including values for a date of an individual user joining the online gaming platform, current level, experience points (XP), total number of tradeable items connected with, total number of tradeable items currently connected with, and/or total number of game assets in an inventory, wherein the first item information includes a first historical user record including user information of the user accounts that the first tradeable item has been previously linked with, wherein the first modification information is adjusted based on values of the statistic information of the user information that are part of the first historical user record.

6. The system of claim 1, wherein the first modification information is adjusted based on values of the attribute information of the game assets the first tradeable item has previously modified based on past asset-item connections of the first tradeable item.

7. The system of claim 1, wherein the first game asset includes one or more particular virtual items within the online gaming platform.

8. The system of claim 1, wherein the one or more processors are further configured to obtain the first modification information, based on the first item identifier, from the electronic storage.

9. A method for modifying game assets of an online gaming platform based on tradeable items that are associated with user accounts of users of the online gaming platform, wherein individual ones of the tradeable items are real-world physical items that include a first tradeable item, wherein the individual ones of the tradeable items are identified by an item identifier, wherein individual ones of the game assets are defined by asset information, the asset information including attribute information, the attribute information defining one or more of type of the individual ones of the game assets, abilities of the individual ones of the game assets, and aesthetics of the individual ones of the game assets, and wherein the online gaming platform executes an instance of an online game, the method comprising:

storing, in electronic storage, item information associated with the tradeable items, wherein the item information includes modification information that is usable to modify attribute information of individual game assets, wherein the individual game assets include one or more virtual items within the online gaming platform, and wherein the item information includes first item information that includes first modification information;

obtaining a first item identifier of the first tradeable item, wherein the first tradeable item is associated with the first item information;

obtaining first user information of a first user account within the online gaming platform, wherein the first user account is associated with a first user, wherein the first user information includes first location information representing a real-world location;

linking the first tradeable item with the first user account within the online gaming platform such that a first item-account connection is established, wherein the first user account includes a first inventory of game assets;

recording the first item-account connection on a distributed ledger, wherein the distributed ledger implements a blockchain;

receiving, from the first user, an indication of a selection of a first game asset from the first inventory of game assets that is to be modified based on the first modification information, such that the first game asset is to be modified in accordance with the first tradeable item;

subsequent to the selection, linking the first game asset with the first tradeable item such that a first asset-item connection is established;

recording the first asset-item connection on the distributed ledger;

performing a modification of the first game asset within the online gaming platform, based on the first modification information of the linked first tradeable item as established through the first asset-item connection, such that the first attribute information of the first game asset is modified in accordance with the first tradeable item; and adjusting the modification of the first game asset based on location information for previously-linked user accounts that were previously linked with the first tradeable item, wherein the location information for previously-linked user accounts is based on previously-stored item-account connections that have been recorded on the distributed ledger.

10. The method of claim 9, wherein the first item information includes a first historical location record including location information of the users whose user accounts have previously linked with the first tradeable item, wherein the first historical location record includes the first location information.

11. The method of claim 9, wherein modifying the first attribute information includes diminishing the first attribute information.

12. The method of claim 9, wherein modifying the first attribute information includes enhancing the first attribute information.

13. The method of claim 9, wherein user information of the individual user accounts includes statistic information, the statistic information including values for a date of an individual user joining the online gaming platform, current level, experience points (XP), total number of tradeable items connected with, total number of tradeable items currently connected with, and/or total number of game assets in an inventory, wherein the first item information includes a first historical user record including user information of the user accounts that the first tradeable item has been previously linked with, wherein the first modification information is adjusted based on values of the statistic information of the user information that are a part of the first historical user record.

14. The method of claim 9, wherein the first modification information is adjusted based on values of the attribute information of the game assets the first tradeable item has previously modified based on past asset-item connections of the first tradeable item.

15. The method of claim 9, wherein the first game asset includes one or more particular virtual items within the online gaming platform.

16. The method of claim 9, further comprising:

obtaining the first modification information, based on the first item identifier, from the electronic storage.

* * * * *